（12）United States Patent
Brizio

(10) Patent No.: US 11,986,120 B2
(45) Date of Patent: May 21, 2024

(54) PROCESS FOR MAKING A PORTABLE BEVERAGE PRODUCT AND A FILLING LINE THEREFORE

(71) Applicant: ALISTELLA SA, Lugano (CH)

(72) Inventor: Adriana Brizio, Ruvigliana (CH)

(73) Assignee: ALISTELLA SA, Lugano (CH)

( * ) Notice: Subject to any disclaimer, the term of this patent is extended or adjusted under 35 U.S.C. 154(b) by 634 days.

(21) Appl. No.: 17/058,164

(22) PCT Filed: May 25, 2018

(86) PCT No.: PCT/EP2018/063839
§ 371 (c)(1),
(2) Date: Nov. 24, 2020

(87) PCT Pub. No.: WO2019/223884
PCT Pub. Date: Nov. 28, 2019

(65) Prior Publication Data
US 2021/0137301 A1    May 13, 2021

(51) Int. Cl.
*A47J 31/00* (2006.01)
*B65B 29/02* (2006.01)

(52) U.S. Cl.
CPC ........... *A47J 31/005* (2013.01); *A47J 31/002* (2013.01); *B65B 29/02* (2013.01)

(58) Field of Classification Search
CPC ........ A47J 31/005; A47J 31/002; A47J 31/40;
A47J 31/303; B65B 29/02; B65B 29/06;
B65B 29/10; B65D 2581/3409; B65D 81/3222; B65D 81/3407; B65D 51/2835;
(Continued)

(56) References Cited

U.S. PATENT DOCUMENTS 865,776 A * 9/1907 Georg .................. A47J 31/303
99/303
2,570,997 A * 10/1951 Willman ............... A47J 31/303
99/317
(Continued)

FOREIGN PATENT DOCUMENTS

CN        203865264 U    10/2014
CN        105683055 A     6/2016
(Continued)

*Primary Examiner* — Dariush Seif
(74) *Attorney, Agent, or Firm* — The Webb Law Firm

(57) ABSTRACT

A process for making a portable beverage product may include the steps of: providing a portable container with an aperture; providing a separation device previously equipped with sealing means including at least one removable barrier; inserting an amount of a drinkable liquid into the container; inserting the separation device into the container to form a first chamber containing the liquid, a second chamber, and a connecting path from the first chamber into the second chamber, the connecting path being closed by the removable barrier; inserting at least one second ingredient into the second chamber; closing the aperture of the container with a cover; wherein the separation device is also positioned in such a way that the removable barrier can be removed in response to a user action on the portable beverage product, thus opening the above mentioned connecting path.

20 Claims, 5 Drawing Sheets

(58) Field of Classification Search
CPC ............ B65D 51/2814; B65D 51/2821; B65D 51/2828
See application file for complete search history.

(56) References Cited

U.S. PATENT DOCUMENTS

| | | | | |
|---|---|---|---|---|
| 3,077,156 A * | 2/1963 | Egi | ........................ | A47J 31/303 99/287 |
| 3,111,079 A * | 11/1963 | Lescure | ................ | A47J 31/303 99/293 |
| 4,167,899 A * | 9/1979 | McCormick | .......... | A47J 31/303 426/77 |
| 4,381,696 A * | 5/1983 | Koral | .................... | A47J 31/106 219/689 |
| 4,498,375 A * | 2/1985 | Bedini | ................... | A47J 31/303 99/303 |
| 4,516,484 A * | 5/1985 | De Ponti | ................. | A47J 31/54 126/379.1 |
| 4,577,080 A * | 3/1986 | Grossman | ........... | A47J 36/027 426/77 |
| 4,642,443 A * | 2/1987 | Jorgensen | ............. | A47J 31/547 99/308 |
| 4,721,835 A * | 1/1988 | Welker | .................. | A47J 31/547 426/433 |
| 5,079,396 A * | 1/1992 | Katz | ...................... | A47J 31/053 99/308 |
| 5,281,785 A * | 1/1994 | Pasbrig | .................. | A47J 31/547 219/689 |
| 6,026,733 A * | 2/2000 | Orrico | ................... | A47J 31/547 99/302 R |
| 6,912,949 B2 * | 7/2005 | Brizio | ................... | A47J 31/303 99/295 |
| D586,172 S * | 2/2009 | Brizio | ............................ | D7/319 |
| 7,569,240 B2 * | 8/2009 | Brizio | ................ | B65D 81/3407 426/77 |
| 7,832,329 B2 * | 11/2010 | Crescenzi | ............. | A47J 31/303 99/323.1 |
| 9,101,241 B2 * | 8/2015 | Brizio | ...................... | A47J 31/04 |
| 9,126,731 B2 * | 9/2015 | Chen | .................. | B65D 51/2835 |
| 9,259,117 B2 * | 2/2016 | Brizio | ................... | A47J 31/303 |
| 9,332,873 B2 * | 5/2016 | Tien | .................... | A47J 31/0636 |
| 9,402,503 B2 * | 8/2016 | Meyl | .................... | A47J 31/547 |
| 9,637,290 B2 * | 5/2017 | Jeon | .................... | B65D 51/285 |
| 2005/0109213 A1 * | 5/2005 | Terada | .................. | A47J 36/022 99/279 |
| 2006/0165851 A1 * | 7/2006 | Brizio | ................... | A47J 31/303 426/106 |
| 2009/0229472 A1 * | 9/2009 | Ferrara, Jr. | ............. | A47J 31/18 99/323 |
| 2011/0056944 A1 * | 3/2011 | Brizio | ................... | A47J 31/303 220/266 |
| 2011/0168030 A1 * | 7/2011 | Brizio | ................... | A47J 31/005 99/323.3 |
| 2011/0168659 A1 * | 7/2011 | Hsieh | ................. | B65D 51/2835 215/250 |
| 2012/0031277 A1 * | 2/2012 | Hsieh | ................... | B65D 1/0223 99/289 R |
| 2015/0056341 A1 * | 2/2015 | Trombetta | .............. | B65B 29/02 53/111 R |
| 2016/0347503 A1 * | 12/2016 | Tsui | .................... | A47J 27/21191 |
| 2021/0137301 A1 * | 5/2021 | Brizio | ..................... | B65B 29/02 |

FOREIGN PATENT DOCUMENTS

| | | |
|---|---|---|
| DE | 102013207734 A1 | 10/2014 |
| EP | 1827181 B1 | 4/2008 |
| EP | 3434158 A1 | 1/2019 |
| ES | 2307197 T3 | 11/2008 |
| SU | 1761112 A1 | 9/1992 |
| WO | 2010031440 A1 | 3/2010 |
| WO | 2010045983 A1 | 4/2010 |
| WO | 2010067326 A1 | 6/2010 |
| WO | 2017162898 A1 | 9/2017 |

* cited by examiner

PROCESS FOR MAKING A PORTABLE BEVERAGE PRODUCT AND A FILLING LINE THEREFORE

CROSS-REFERENCE TO RELATED APPLICATION

This application is the United States national phase of International Application No. PCT/EP2018/063839 filed May 25, 2018, the disclosure of which is hereby incorporated by reference in its entirety.

BACKGROUND OF THE INVENTION

Field of the Invention

The invention relates to a process for making a portable beverage product. Particularly, the invention relates to a process for the manufacturing of a beverage can allowing the user to prepare the beverage at the time of consumption.

Description of Related Art

A prior art process for making a portable beverage product includes the basic steps of: providing a portable container with an aperture, for example a can, inserting an amount of a beverage into said container, closing the container.

This process is used for example for beverage cans. A beverage can is filled with the beverage, usually after purging the air, and immediately closed with a lid which is suitably crimped on the upper edge of the can. The process may include adding a gas, usually carbon dioxide, for artificially adding bubbles to the beverage.

This process provides a ready to drink beverage product, for example a soft drink can. However, it is not suitable for the manufacturing of a product allowing self-preparation of the beverage at the time of consumption.

SUMMARY OF THE INVENTION

The invention aims to provide a process for the manufacturing of a beverage product, wherein the product allows self-preparation of the beverage by contacting at least a first liquid ingredient with a second ingredient. The invention aims to a process for the manufacturing of a product which contains, in a single package, both the first ingredient and the second ingredient and allows the preparation of the beverage at the time of consumption.

In a first and most general embodiment, the aim is reached with a process according to the present disclosure. Some preferred embodiments are also described in the present disclosure.

In a $2^{nd}$ embodiment, the process includes the following steps: the first liquid ingredient is introduced in the container; the separation device is placed above the liquid level so that the second chamber is above the separation device; said separation device is placed at a suitable height relative to the walls of the container, said height being selected so that the second chamber has a volume equal to or greater than the volume of first ingredient contained in the first chamber.

In a 3rd embodiment, the process includes the step of positioning a hollow filtering device inside the second chamber, and said filtering device contains, or is suitable to contain, said at least one second ingredient.

In a 4th embodiment, the process includes the step of loading the filtering device, before insertion into the container, with said at least one second ingredient.

In a $5^{th}$ embodiment, the process includes the step of loading the filtering device, after insertion into the container with said at least one second ingredient.

In the above 4th embodiment and $5^{th}$ embodiment, the process preferably includes the step of loading the at least one second ingredient in a solid form which is soluble in the first ingredient, or is adapted to deliver an infusion process upon contact with the first ingredient.

In a 6th embodiment, the process includes the step of laying said at least one ingredient directly onto part of an upper surface of the separating device. For example, in a specific embodiment, the process includes selecting the separating device in the form of a baffle and laying the second ingredient over said baffle.

In a 7th embodiment, the process includes the step of wrapping said at least one second ingredient totally or partially by a filtering structure independent from the separation device. In a preferred embodiment, the process includes selecting said filtering structure in the form of any of: a net, a fabric, a filter made of a nonwoven material, a filter made of nylon or another plastic material.

In an 8th embodiment, the process includes the step of selecting the at least one second ingredient in the form of a powder. According to a preferred specific embodiment, the process includes the step of: selecting pure coffee or a coffee-containing powder as the second ingredient. In some specific embodiments, the process may include the step of including a freeze-dried (lyophilised) product in the second ingredient. For example, the process may include selecting a freeze-dried product including meat or vegetables.

In a 9th embodiment, the process may include the provision of the separation device with a removable barrier in the form of any of: a baffle, a septum, a frangible barrier. The process includes selecting a removable barrier designed to be removed or broken in response to a predetermined action of the user. In a specific embodiment, the process includes providing the separation device with a frangible barrier to be perforated by the user. In another embodiment, the process includes arranging the separation device in order to provide the break or removal of the removable barrier by an increase of the pressure of the liquid contained in the first chamber. Such increase of pressure may be given by heating the container.

In a $10^{th}$ embodiment, the process comprises the step of: providing the separation device with a frangible barrier and with perforation means adapted to perforate said frangible barrier in order to open said connecting path.

More preferably, the process includes the step of providing the container with perforation means which can be operated by the user. According to a specific embodiment, the process includes the step of placing the perforation means in a position accessible by the user when the user opens the container for the use.

In an 11th embodiment, the process includes the step of: providing the separation device with a housing and placing a filtering device containing, or suitable to contain, the at least one first ingredient in said housing. In a specific embodiment, the process comprises the step of providing said housing in the form of a hollow chamber. More preferably, the process comprises the step of arranging said hollow chamber to form part of said connecting path, so that the first liquid ingredient can traverse the hollow chamber and enter the filtering device when flowing from the first chamber to the second chamber.

The passage of the first liquid ingredient through the hollow chamber to enter the filtering device may result in a process of infusion according to the nature of the ingredients which are adopted in the course of the process. For example, in some embodiments the process comprises selecting the second ingredient in the form of a powder so that an infusion is performed when the first liquid ingredient at a hot temperature comes into contact with said powder.

According to a $12^{th}$ embodiment, the process includes the step of: giving a hollow shape to the separation device or to a part of the same, such that said separation device or said part of the separation device can be loaded with said at least one second ingredient and act as a filtering device.

In a 13th embodiment, the process includes: providing the separation device with a housing in the form of a through hole, fixing a connecting path through said hole in a sealed manner so that said connecting path becomes part of the separation device and closing said connecting path by said removable barrier.

In a $14^{th}$ embodiment, the process includes the step of adopting more than one pieces to form the separation device and connecting said pieces in a sealed manner so to perform a unique separation device structure.

In a $15^{th}$ embodiment, the process includes the step of shaping in the form of a tube at least one of said pieces to be connected and inserting said tube in a sealed manner in a housing of the separation device wherein said housing is realized in the form of a through hole, one end of said tube being closed by a frangible barrier.

According to a $16^{th}$ embodiment, the process comprises the provision of a separation device including at least a first component and a second component, and the process also comprises the steps of:

positioning said first component to provide a frangible seal between the first chamber and the second chamber; and positioning the second component in a position, relative to the first component, wherein the second component can be operated by the user to break said frangible seal and open said connecting path from the first chamber to the second chamber via said housing.

In preferred embodiments, the process may include the provision of the second component in the form of a displaceable perforation means adapted to perforate the frangible barrier and open the above mentioned connecting path.

The process may comprise the insertion of the second component together with the first component or after the first component. The process may comprise that the first component and the second component are inserted manually or, more preferably, mechanically in an automated process.

In a $17^{th}$ embodiment, the process includes the step of: providing the second component in the form of a rod which is inserted through said housing into said connecting path.

In an $18^{th}$ embodiment, the process includes the step of positioning the separation device such that the second chamber is above the first chamber. For example, the process includes that the container is vertically arranged and the separation device is placed at a suitable height relative to the container, so that the volume of the container is divided into a bottom first chamber and upper second chamber.

In a $19^{th}$ embodiment, the process includes a step of sterilization of the container, before the insertion of the separation device.

In a $20^{th}$ embodiment, the process includes providing a can as the portable container.

In a $21^{st}$ embodiment, the process comprises the step of selecting a metal or aluminium can. Aluminium is preferred because it can be efficiently recycled. The process may include selecting a can made of aluminium and plastics.

More preferably the process includes selecting a metal can of a standard size. For example the process may include the provision of a can of a standard size of 25 cm$^3$, 33 cm$^3$ or 50 cm$^3$.

In a $22^{nd}$ embodiment, the process includes the step of selecting a container made of a material suitable for microwave heating.

In a $23^{rd}$ embodiment, the process includes inserting water into the container.

In a $24^{th}$ embodiment, the process includes the step of purging air from the second chamber and introducing an inert gas in the second chamber. Preferably, the process includes selecting nitrogen as inert gas.

In a $25^{th}$ embodiment, the process includes the step of introducing a selected amount of a propeller gas in the first chamber.

Said propeller gas may be selected to promote the flow of the first liquid from the first chamber to the second chamber in response to the action of the user. In some embodiments, the process includes that said propeller gas is also selected to act as a foaming and/or texturing agent, i.e. to give the beverage a desired foaming and/or texture. In some embodiments, the process includes the introduction of said propeller gas under pressure.

In a $26^{th}$ embodiment, the process includes the step of selecting nitrogen as the above mentioned propeller gas. The provision of nitrogen as the propeller gas is particularly preferred in combination with the second ingredient being coffee or a coffee-based ingredient, suitable for the preparation of coffee. It has been noted that nitrogen provides an agreeable foaming effect in the preparation of coffee.

In a $27^{th}$ embodiment, the process includes: applying at least one piece containing a ferromagnetic material to the outside bottom of the container. This piece allows induction heating of the container.

In a $28^{th}$ embodiment, the process includes the step of selecting said piece containing ferromagnetic material in the form of an adhesive label. This facilitates the step of application of said ferromagnetic piece, e.g. to the bottom of a metal can.

In a $29^{th}$ embodiment, the process includes the step of providing one or more structural parts of the container with safety means adapted to avoid overpressure of the container.

In a $30^{th}$ embodiment, the process includes the step of: providing said one or more structural parts of the container with a weakened portion adapted to break in case of overpressure inside the container. For example, the process comprises the step of making a thinner portion of the container or of the cover, so that the thinner portion can break in the event of overpressure.

In a 31st embodiment, the process includes the step of providing at least one surface of the container with a thermo-insulating layer or a thermo-insulating element. More preferably, the process includes selecting a thermo-insulating element in the form of a ring and placing said ring around the container. Accordingly, the process allows drinking directly from the container even if the container is at high temperature.

In a 32nd embodiment, the process comprises the step of selecting pure coffee or a coffee-containing powder as the second ingredient.

In the above cited embodiments, the process provides that the separation device, relative to the container, is positioned in such a way that the second chamber has a volume equal to or greater than the volume of the first ingredient contained in the first chamber. The process may also provide that the separation device, relative to the container, is positioned in such a way that the second chamber has a volume which is at least equal to a volume of the first ingredient which is intended to pass from the first chamber to the second chamber, during the preparation of the beverage.

An aspect of the invention is also a production line.

The features and advantages of the invention can be summarized as follows.

The process of the invention provides the packing of both the first ingredient and the second ingredient in a sealed package, the two ingredients being temporarily isolated by the separation device. The process also provides said connecting path wherein the first ingredient is admitted in response to the action of the user which removes the removable barrier.

In a product obtainable with the process of the invention, a beverage can be prepared when the removable barrier is removed and the first ingredient flows through the connecting path. The beverage is collected in the second chamber and said second chamber can be accessed by the user for consumption of the beverage. For example, the second chamber can be accessed by removing the cover of the container or by opening a suitable aperture of the cover.

In some embodiments, the process comprises the provision of a hollow filtering chamber in the separation device and, accordingly, an infusion process will take place in the hollow filtering chamber.

Therefore the user does not need fresh water or any other fresh ingredient for the preparation of the intended beverage. On the other hand, the beverage is freshly prepared in response to the action of the user by putting the container in contact with a heating source, when the first ingredient comes into contact with the second ingredient. The flavour of the resulting fresh prepared beverage is therefore better than that of a conventional pre-packed beverage.

The process of the invention can be used, in a preferred application, for making a self-preparable canned coffee; the process however can be also used for making different beverage products.

The step of provision of said propeller gas facilitates the preparation of the beverage and the transfer of the liquid from the first chamber to the second chamber. In some embodiments, the provision of a suitable propeller gas also provides a foaming effect, giving the final beverage a desired texture and flavour.

The process of the present invention may include that the container is arranged for preparation of the beverage upon heating the container. The process may include the step of arranging the container in such a way that heating the container results in a slight pressurization of the first ingredient in the first chamber, and said pressurization promotes the flow through the connecting path to the second chamber.

The step of provision of a ferromagnetic appliance allows the heating of the container by induction. The step of providing a thermo-insulating element is advantageous in these embodiments, because it allows drinking directly from the hot container.

The invention is now elucidated with reference to a preferred and non-limiting embodiment.

DETAILED DESCRIPTION OF THE INVENTION

Figure 1:
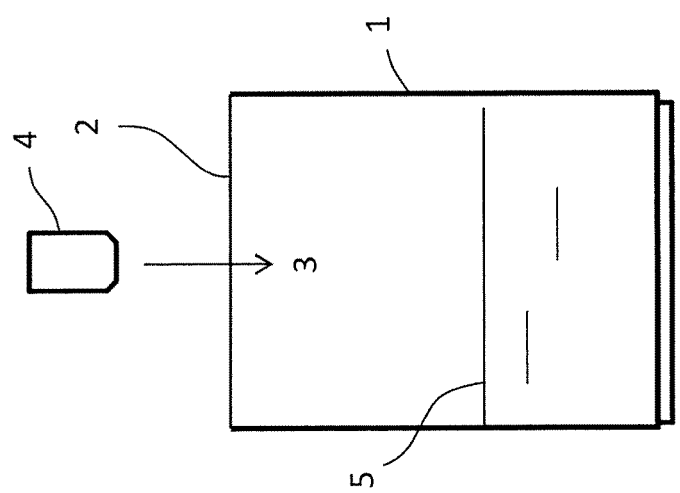
FIG. 1 shows a scheme of an embodiment of a process for making a beverage product according to one embodiment or aspect of the invention.

In FIG. 1, an aluminium can 1 with a top aperture 2 is filled with a first ingredient in the form of a liquid, such as water 3, by means of a filling head 4. Before this filling operation, air can be removed from the can 1 e.g. by insufflation of nitrogen or another inert gas.

The filling head 4 delivers a predetermined amount of the liquid 3, until the latter reaches a desired level 5 in the bottom of the can 1.

Figure 2:
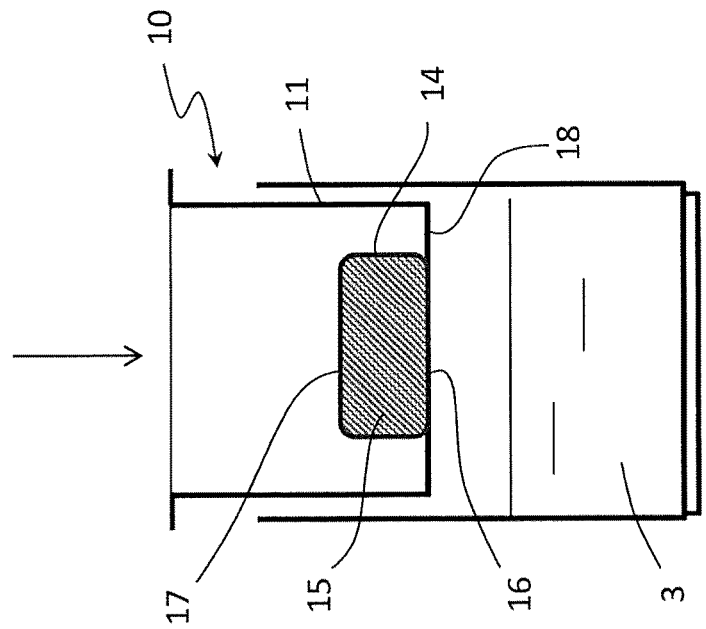
FIG. 2 shows a scheme of an embodiment of a process for making a beverage product according to one embodiment or aspect of the invention.

FIG. 2 illustrates a subsequent step wherein a separation device 10 is introduced in the can 1 through the aperture 2. In this example the separation device 10 includes a container 11.

Once the separation device 10 is fully inserted in the can 1, the inner space of the can 1 is divided into a first chamber 12 and a second chamber 13.

The first chamber 12 is below the separation device 10 and contains the amount of water previously introduced by the filling head 4.

Figure 3:
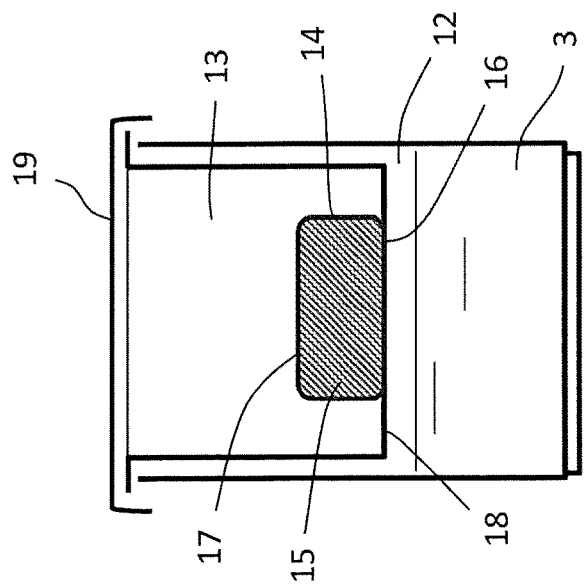
FIG. 3 shows a scheme of an embodiment of a process for making a beverage product according to one embodiment or aspect of the invention.
Figure 6:
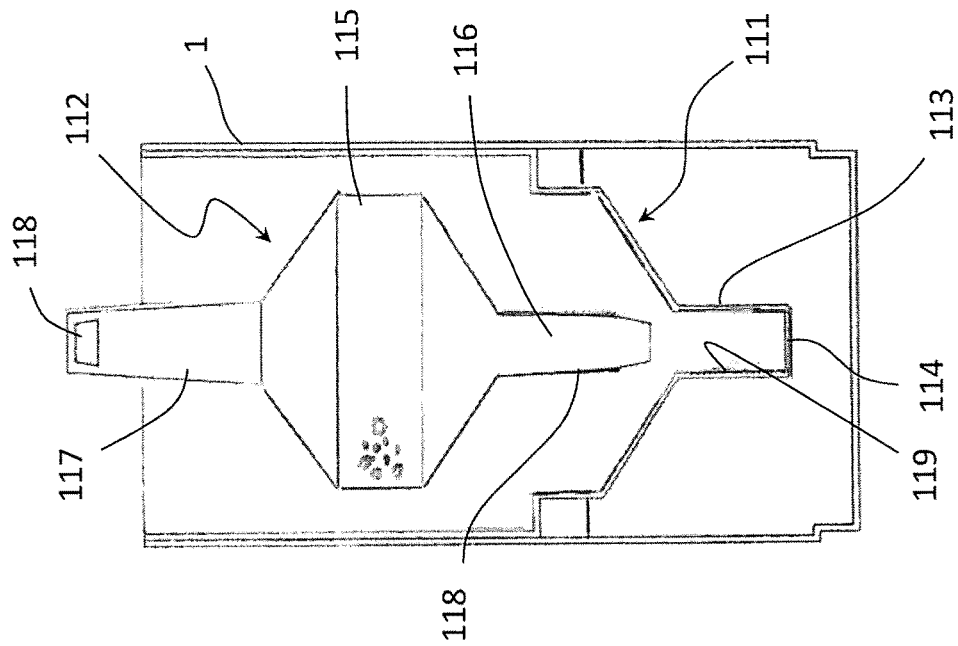
FIG. 6 shows another embodiment of the process for making a beverage product according to another embodiment or aspect of the invention.
Figure 5:
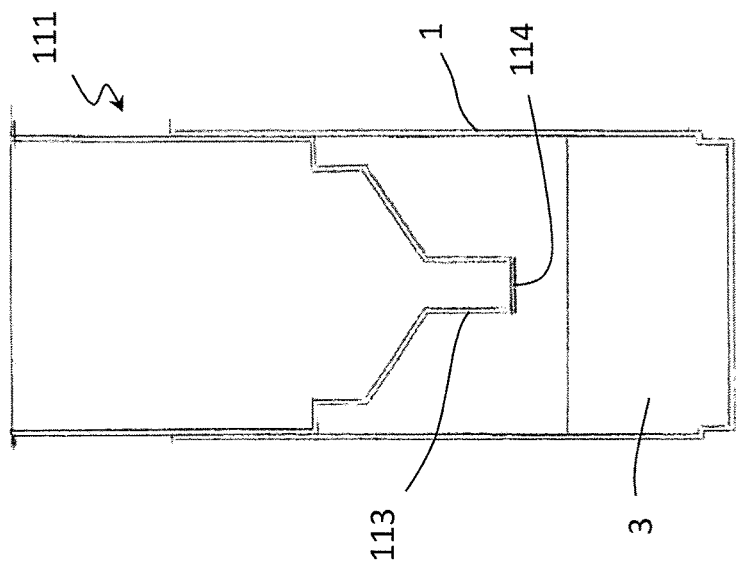
FIG. 5 shows another embodiment of the process for making a beverage product according to another embodiment or aspect of the invention.

The second chamber 13 is provided by the container 11 and is designed to collect an intended amount of the water 3, which is the amount that will pass into the second chamber during the preparation of the beverage. Preferably, the second chamber 13 has a volume greater than the volume of water contained in the first chamber 12 (FIG. 3). However a residual amount of water may also remain in the first chamber after preparation of the beverage.

The separation device 10 includes an infusion chamber 14 filled with an additional ingredient 15 for the preparation of a beverage, for example coffee 15.

The first chamber 12 and the second chamber 13 are separated by the walls of the container 11.

The separation device 10 includes at least one frangible seal 16 between the first chamber 12 and the infusion chamber 14. The separation device 10 includes a permeable passage between the infusion chamber 14 and the second chamber 13. In the example said permeable passage includes a permeable wall 17.

The frangible seal 16 may be a part of a surface of the container 11, for example a part of the bottom wall 18.

The can 1 is then closed, in a sealed manner, by placing a lid 19 on top of the can 1 and container 11. The second chamber 13 is accessible by a user (consumer) e.g. by removing the lid 19 or by means of a suitable opening on the lid 19.

Figure 4:
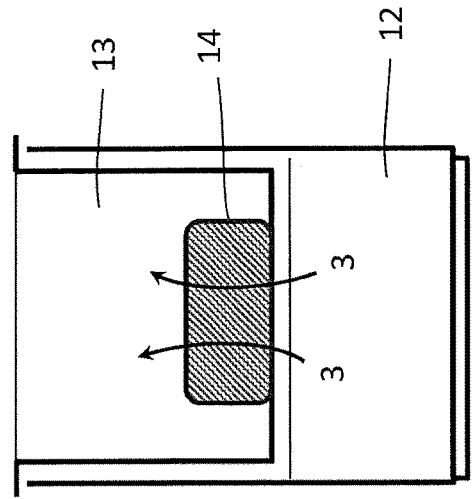
FIG. 4 shows the use of a beverage product obtained with the process shown in FIGS. 1-3.

FIG. 4 illustrates operation of the device, in the embodiment of FIGS. 1 to 3.

A predetermined action of the user causes the rupture of the frangible seal 16. Said predetermined action may include the perforation of the seal 16 with a suitable perforation means, e.g. a cannule or a movable rod. The perforation means may be part of the separation device.

The water 3 initially contained in the first chamber 12 is then transferred into the second chamber 13, passing through the infusion chamber 14 and the permeable wall 17, as shown by the arrows of FIG. 4. The motive force of said transfer may be pressurization of the water 3 due to a heating of the can 1.

The water 3 therefore contacts the ingredient 15 and starts an infusion process; the resulting beverage is collected in the second chamber 13. The beverage can be consumed from said second chamber 13 which is directly accessible by the user, e.g. opening the can.

FIGS. 5 to 8 illustrate an embodiment of the process comprising the provision of a separation device 110 including a first component (housing) 111 and a second component (filter) 112.

The housing 111 is introduced first in the can 1, and then the filter 112 is fitted into the housing 111.

The process includes a step of selecting a housing 111 having a bottom duct 113 closed by a frangible membrane 114. The housing 111 is positioned in such a way that the end of said bottom duct 113 is immersed in the water 3.

The filter 112 is selected having an infusion chamber 115, a bottom duct 116 and an upper duct 117 with one or more aperture 118. The infusion chamber 115 is filled, before insertion into the container 1, with the second ingredient, e.g. coffee.

The filter 112 is positioned in such a way that the aforesaid duct 116 fits into the duct 113 of the housing 111, and an outer thread 118 of the filter duct 116 mates with an inner thread 119 of the housing duct 113. The filter 112 is positioned in such a way that the bottom end remains above the membrane 114. The container 1, after insertion of said housing 111 and filter 112, is closed with a top cover.

Figure 7:
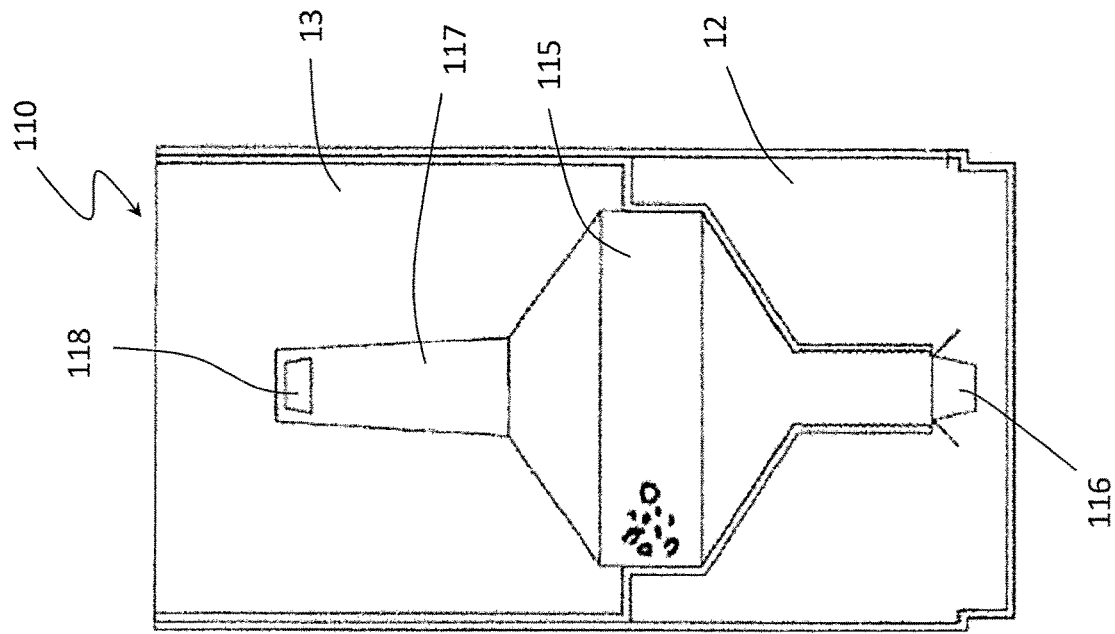
FIG. 7 shows another embodiment of the process for making a beverage product according to another embodiment or aspect of the invention.
Figure 8:
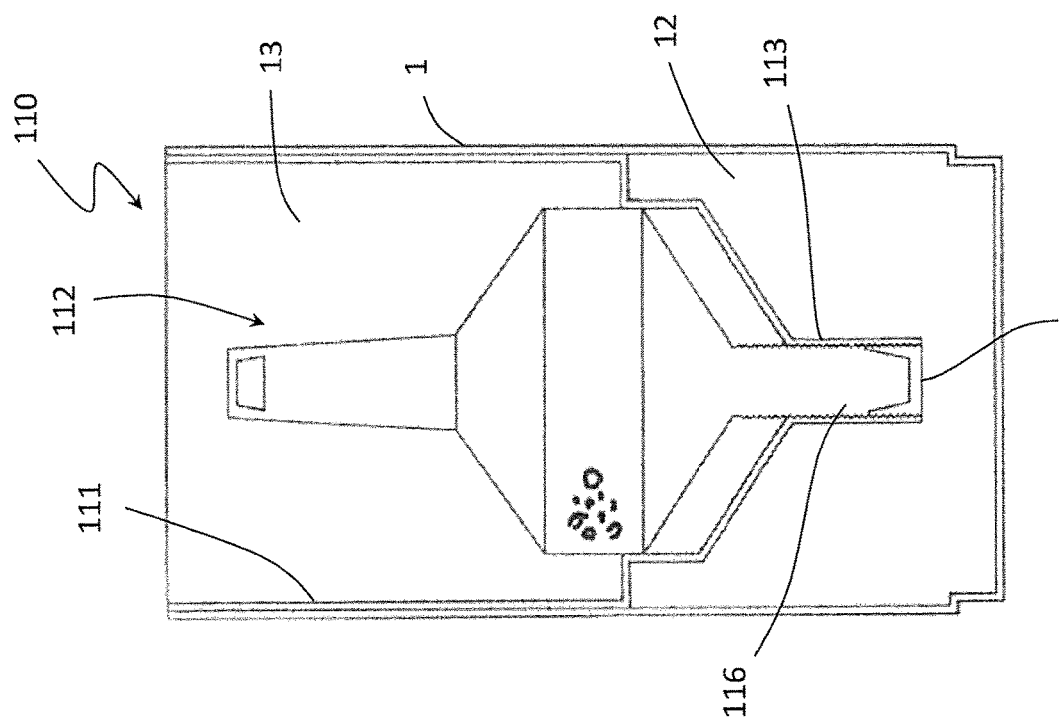
FIG. 8 shows another embodiment of the process for making a beverage product according to another embodiment or aspect of the invention.

As shown in the FIGS. 7 and 8, a rotation of the filter 112 relative to the housing 111 causes the duct 116 to break the membrane 114, allowing a water flow (induced e.g. by heating) from the first chamber 12 to the second chamber 13, via a connecting path including the duct 116, the infusion chamber 115, the upper duct 117 and the apertures 118. While traversing the infusion chamber 115, the hot water performs an infusion process with the coffee powder and a fresh prepared coffee is collected in the chamber 13.

The rotation of the filter 112 can be made by the user, after opening the container 1 by removing the top cover.

Figure 9:
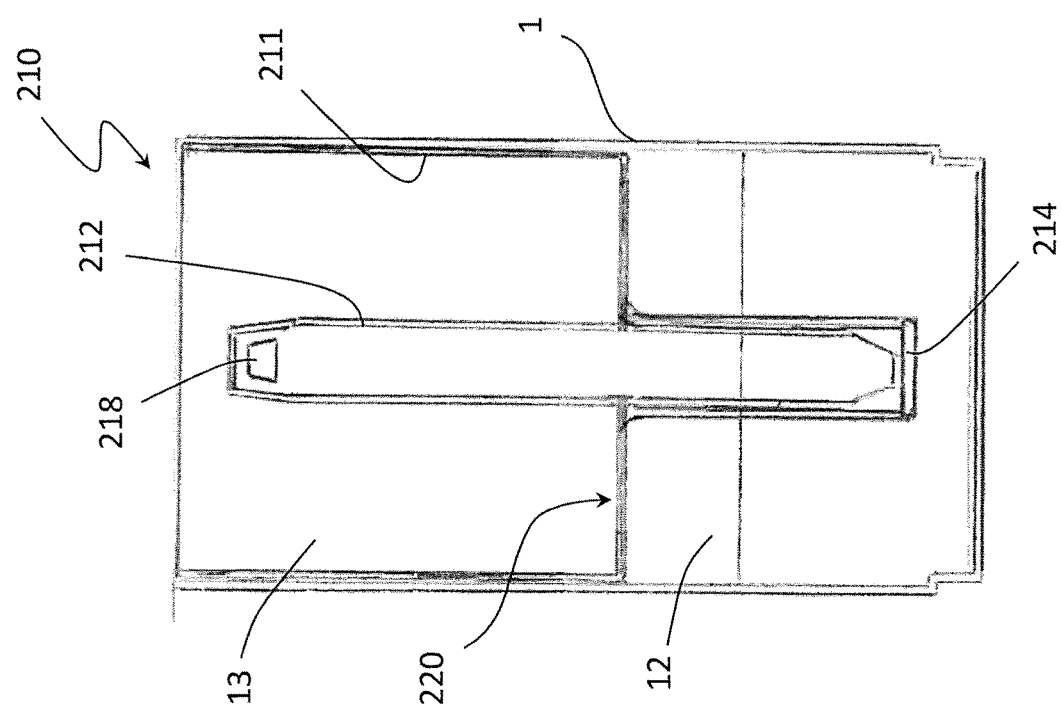
FIG. 9 shows yet another embodiment of the process for making a beverage product according to yet another embodiment or aspect of the invention.

FIG. 9 illustrates another embodiment wherein the process comprises the provision of a separation device 210 including a first component selected as housing 211 and a second component selected as duct 212. The piercing of the membrane 214 is made by the lower end of the duct 212, which operates similar to the duct 116 of the above described embodiment.

In the embodiment of FIG. 9, the process includes the step of depositing the second ingredient (e.g. soluble coffee) on a surface 220 of the housing 211 and, accordingly, no infusion chamber is required. After piercing the membrane 214 with the duct 212, a connecting path is formed by the duct 212 itself. Water flows through the duct 212 and apertures 218 into the chamber 13, where it comes into contact with the soluble coffee contained in the housing 211.

In another embodiment the process includes the step of providing a duct 212 which is fixed (i.e. not displaceable) relative to the housing 211. In this case, to break the removable barrier 214, the process may comprise the provision of a movable rod inside the duct 212.

Although the present disclosure has been described with reference to specific exemplary embodiments, it is understood that modifications and changes can be made to these examples without departing from the general scope of the disclosure as defined herein. Particularly, individual characteristics of the different illustrated/mentioned embodiments can be combined in additional embodiments. Consequently, the description and the drawings should be considered in an illustrative rather than a restrictive sense.

It is also understood that all the characteristics described with reference to a method can be transposed, alone or in combination, to a device, and conversely, all the characteristics described with reference to a device can be transposed, alone or in combination, to a method.

The invention claimed is:

1. A production line for the production of beverage products, the production line comprising:
   a filling head suitable for inserting an amount of a first ingredient into a container, the first ingredient being liquid,
   a first insertion means for inserting a separation device into the container, wherein the first insertion means is controlled to place the separation device in a target position that defines a first chamber and a second chamber of the container, separated by at least one removable barrier,
   a second insertion means for inserting an amount of at least one second ingredient,
   wherein the first ingredient and the at least one second ingredient are selected so that a contact between the first ingredient and the at least one second ingredient form a drinkable product,
   a closing means adapted for closing the container in a sealed manner, after the insertion of the separation device, to form a portable beverage product,
   wherein the target position of the separation device, relative to the container, is such that:
   the separation device and its sealing means delimitate, in a sealed manner, a first chamber of the container and a second chamber of the container, wherein the first chamber contains the amount of first ingredient and the separation device provides a connecting path for the first ingredient to flow from the first chamber into the second chamber, the connecting path being closed by the at least one removable barrier, and
   the removable barrier is removable in response to a user action on the portable beverage product, thus opening the connecting path.

2. The production line of claim 1, further comprising insertion means for inserting at least one movable component adapted to perforate the at least one removable barrier under action of the user.

3. The production line of claim 1, including means to position a hollow filtering device inside the second chamber, wherein the filtering device contains, or is suitable to contain the at least one second ingredient.

4. The production line of claim 3, including means for loading the filtering device, before or after insertion into the container, with the at least one second ingredient, and means for loading the at least one second ingredient in a solid form which is soluble in the first ingredient or adapted to deliver an infusion process upon contact with the first ingredient.

5. The production line of claim 1, including means for laying the at least one second ingredient directly onto part of an upper surface of the separation device.

6. The production line of claim 1, wherein the at least one second ingredient is in the form of a powder.

7. The production line of claim 1, wherein the separation device is provided with any of: a baffle, a septum, a frangible barrier, and a frangible barrier and with perforation means adapted to perforate the frangible barrier in order to open the connecting path.

8. The production line of claim 1, wherein: the separation device is provided with a housing and wherein the production line is configured to place a filtering device in the housing,
wherein the filtering device contains, or is suitable to contain the at least one second ingredient.

9. The production line of claim 1, wherein: the separation device or a part of the separation device has a hollow shape, such that the separation device or the part of the separation device is loaded with the at least one second ingredient and act as a filtering device.

10. The production line of claim 1, wherein the separation device is provided with a housing in the form of a through hole, wherein
the production line includes means for fixing a connecting path through the through hole in a sealed manner so that the connecting path becomes part of the separation device and
closing the connecting path by the removable barrier.

11. The production line of claim 1, wherein the separation device is formed by more than one pieces and the production line includes means for connecting the pieces in a sealed manner so to perform a unique separation device structure.

12. The production line of claim 11, wherein at least one of the pieces to be connected is shaped in the form of a tube,
wherein the production line includes a means for inserting the tube in a sealed manner in a housing of the separation device, and
wherein the housing is realized in the form of a through hole, one end of the tube being closed by the removable barrier.

13. The production line of claim 1, wherein said separation device includes at least a first component and a second component, and wherein the production line is configured for:
positioning the first component to provide a frangible seal between the first chamber and the second chamber;
positioning the second component in a position, relative to the first component, wherein the second component can be operated by the user to break the frangible seal and open he connecting path from the first chamber to the second chamber via the housing; and
inserting the second component into the connecting path.

14. The production line of claim 1, wherein the target position of the separation device is such that the second chamber is above the first chamber.

15. The production line of claim 1, wherein the container is made of a material suitable for microwave heating.

16. The production line of claim 1, comprising including at least one of: a means for purging air from the second chamber; a means for introducing an inert gas in the second chamber; a means for introducing a selected amount of a propeller gas in the first chamber.

17. The production line according to claim 1, further comprising means of applying a piece containing a ferromagnetic material to an outside bottom of the container.

18. The production line according to claim 1, further comprising means for providing one or more structural parts of the container with safety means adapted to avoid overpressure of the container, wherein the one or more structural parts of the container has a weakened portion adapted to break in case of overpressure inside the container.

19. The production line according to claim 1, further comprising means for providing at least one surface of the container with a thermo-insulating layer or with a thermo-insulating element.

20. The production line of claim 1, wherein said target position is selected so that: the separation device is placed above the liquid level so that the second chamber is above the separation device; said separation device is placed at a selected height relative to the walls of the container, so that the second chamber has a volume equal to or greater than the volume of first ingredient contained in the first chamber.

* * * * *

UNITED STATES PATENT AND TRADEMARK OFFICE
CERTIFICATE OF CORRECTION

| | | |
|---|---|---|
| PATENT NO. | : 11,986,120 B2 | |
| APPLICATION NO. | : 17/058164 | |
| DATED | : May 21, 2024 | |
| INVENTOR(S) | : Adriana Brizio | |

It is certified that error appears in the above-identified patent and that said Letters Patent is hereby corrected as shown below:

In the Claims

Column 10, Line 10, Claim 13, delete "he" and insert -- the --

Signed and Sealed this
Ninth Day of July, 2024

Katherine Kelly Vidal
*Director of the United States Patent and Trademark Office*